(12) United States Patent
Fischer et al.

(10) Patent No.: US 6,550,439 B1
(45) Date of Patent: Apr. 22, 2003

(54) SUCTION TUBE WITH SWITCHING ELEMENT

(75) Inventors: Christian Fischer, Fellbach (DE);
Martin Galm, Buchen-Einbach (DE);
Robert Vaculik, Marbach (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/856,370
(22) PCT Filed: Nov. 17, 1999
(86) PCT No.: PCT/EP99/08846
§ 371 (c)(1),
(2), (4) Date: Oct. 18, 2001
(87) PCT Pub. No.: WO00/31391
PCT Pub. Date: Jun. 2, 2000

(30) Foreign Application Priority Data

Nov. 21, 1998 (DE) ......................................... 198 53 741

(51) Int. Cl.[7] ............................................. F02M 35/10
(52) U.S. Cl. ............................... 123/184.47; 123/184.55
(58) Field of Search ....................... 123/184.55, 184.47, 123/184.56, 184.53, 184.61

(56) References Cited

U.S. PATENT DOCUMENTS 5,546,900 A * 8/1996 Adamek et al. ........ 123/184.55
6,267,091 B1 * 7/2001 Nishida et al. ......... 123/184.55

* cited by examiner

Primary Examiner—Gene Mancene
Assistant Examiner—Hyder Ali
(74) Attorney, Agent, or Firm—Crowell & Moring LLP

(57) ABSTRACT

A suction tube with a switching element for longitudinal adjustment of different tube sections (16), particularly a suction tube having a drum switch (12). The invention provides for sealing strips (29) or sealing rings (17) which are supported inside the suction tube casing (14). This results in a relative movement between the drum switch (12) and the sealing elements fixed to the casing. The positioning of the sealing elements in the suction tube casing (14) is advantageous for assembly and allows for better compensation of tolerances in the sealing gap between the drum switch (12) and the suction tube casing (14).

12 Claims, 3 Drawing Sheets

SUCTION TUBE WITH SWITCHING ELEMENT

BACKGROUND OF THE INVENTION

The invention relates to a suction tube with a switching element, particularly for adjusting the length of different segments of the suction tube.

Suction tubes are generally known. The employed switching elements primarily adjust the length of the intake ports connecting the plenum to the cylinder intakes. To this end, the switching elements must be movable. In most cases, they are therefore cylindrical, and the desired adjustment in the suction tube length is obtained by rotating the switching element.

To adjust the length, the switching elements communicate with the walls of the suction tube. To be able to use the acoustic or flow effects of the adjustment in the suction tube length, the gaps created between the suction tube wall and the switching element must be sealed as tightly as possible, even though an absolute seal is not necessary since these are seals between ducts that carry filtered air. This may be achieved by a high dimensional accuracy of the switching elements and the suction tube walls and may be enhanced by providing sealing rings. One technical solution is indicated in DE 44 23 427 A1. This document proposes seating rings, which can be inserted into grooves in the cylindrical switching element and which have a larger diameter than the mounting opening for the switching element. As a result, when the switching element is installed, the sealing rings are elastically deformed to provide a seal against the suction tube wall. The aforementioned sealing options for switching elements in the suction tube are, however, associated with high production or assembly costs. Particularly in suction tubes that are made of synthetic resin material, due to material shrinkage after molding, sufficient dimensional accuracy of the switching element and the suction tube to ensure a satisfactory seal can be obtained only by costly finish-machining. Although the sealing rings arranged in the drum switch are capable of compensating such tolerances, they make it more difficult to mount the switching element in the associated opening. For in many cases, the mounting opening has abrupt diameter differences to form curved intake cross sections. The switching element, after installation, forms a wall segment of said curved intake cross sections. For assembly, the drum equipped with the sealing rings must be pushed through the hollow spaces, which invariably causes the sealing rings to re-expand to their original diameter. They must then be brought back to their installation diameter in places where the sealing gap is located between the mounting opening and the switching element, which are extremely difficult to access. Furthermore, if the mounting opening is out of round, it is impossible to obtain a complete seal even with the use of sealing rings supported in the switching element, since the sealing rings cannot completely adapt to the out-of-round inside contour of the mounting opening without the adjusting forces of the switching drum assuming excessively high values.

SUMMARY OF THE INVENTION

The object of the invention is to create a suction tube provided with sealing means between the switching element and the associated mounting opening, which is easy to install and at the same time provides an optimal seal between the suction tube segments. This seal should be largely independent of the tolerances that occur in the suction tube and the switching element.

This object is attained by the invention as described and claimed hereinafter.

The suction tube according to the invention has at least one switching element, which is movably arranged inside the suction tube. Between the walls of the suction tube and the switching element, gaps are created. These gaps are sealed by sealing means supported inside the suction tube so that, as the switching element moves, there is a relative movement between the sealing means and the switching element. The sealing means are at least partially elastic and are made in such a way that the elastic parts or the entire sealing means are elastically deformed when installed. This can be used to create a surface pressure, which is used either to fix the sealing means inside the suction tube or to obtain a sealing effect between the switching element and the sealing means. Alternatively, the sealing means may be fixed inside the suction tube by a form-fit connection, particularly a groove. Important is that the form-fit connection does not prevent the sealing effect of the sealing means, i.e., that it allows, for instance, the sealing means to be pressed against the switching element. If the sealing means are pressed against the switching element, i.e., if there is contact between these components, the contact pressure must be low enough that a relative movement between the sealing means and the switching element is still possible. Alternatively, a contact-free seal, particularly a labyrinth seal, may be provided. As an alternative to the aforementioned form-fit and frictional connection options, the sealing means may also be fixed inside the suction tube by material coupling, particularly by gluing.

The above-described sealing means are suitable for roughly toleranced synthetic resin tubes and their synthetic resin switching elements. In particular, sealing rings that are completely elastic can be adapted to the wall of a cylindrical mounting opening to receive the switching element if these are out of round. This is made possible in that the sealing means are fixed inside the cylindrical mounting opening and thus do not need to rotate as the switching element is adjusted. The suction tube according to the invention may of course also be made of other materials besides synthetic resin, e.g., aluminum or magnesium or a combination of these materials.

For the aforementioned reasons it is particularly advantageous to design the switching element as a cylindrical body, particularly as a drum switch. Due to out-of-roundness of the drum switch or the cylindrical mounting opening, differently sized gaps are created along the circumference, which may be compensated by sealing means. This may be accomplished, in particular, by providing grooves in the drum switch, so that the sealing means in conjunction with these grooves form a labyrinth seal. What has been said above regarding drum switches is also true for rotary slide valves.

According to another embodiment of the invention, the sealing means may also be configured as sealing strips. Sealing strips make it possible to seal the gap formed by the suction tube wall and the switching element along a straight line. Depending on the elasticity of the sealing strip, it is also possible to realize a slightly winding or curved shape of the sealing gap. Sealing through sealing strips is possible, for instance, in slide valves. Sealing gaps along the end faces of cylindrical switching elements may also be sealed in this manner. Alternatively, the sealing strip may be arranged in a cylindrical mounting opening parallel to the axis of rotation of a cylindrical switching element.

In cylindrical mounting openings, according to an advantageous embodiment of the idea underlying the invention, the sealing ring takes the shape of a circular ring. The sealing ring may be advantageously provided with an elastic layer along its outer circumference, which after installation contacts the walls of the suction tube and thus ensures fixation. The elastic layer is preferably made of silicon or sponge rubber. To increase the contact pressure to fix the sealing ring against the suction tube wall, the ring may be provided with a larger diameter than that available in the mounting opening. In this case it must be slit, so that it can be elastically deformed for installation. The slit may be configured in such a way that the ends of the sealing ring overlap to obtain an optimal sealing effect in the slit area. The slit may also comprise a recess that is wide enough so that a sealing strip may be provided in the cylindrical mounting opening, which crosses the sealing rings.

If the suction tube casing is longitudinally split, the slit in the sealing rings may be eliminated. In this case, the sealing rings may be inserted into the mounting opening before the casing shells are assembled. The sealing rings may, for instance, comprise a rigid ring, the outer circumference of which is provided with a groove to receive a sealing ring. The sealing ring is the elastic layer.

An advantageous embodiment of the sealing ring provides for a garter spring to be placed along the ring's inner surface. When the sealing ring is installed this garter spring is compressed and thus exerts an outwardly directed radial force on the sealing ring, which further presses the sealing ring against the suction tube wall. In this case, the sealing ring may be very soft, so that it can particularly well adapt to out-of-roundness in the cylindrical mounting opening. This type of sealing ring is best combined with the above-described labyrinth seal, which interacts with grooves in the switching element. The flexibility of the sealing ring can be influenced not only by a corresponding material selection but also by changing the ring cross section.

In contrast, if the sealing means are supported in grooves of the suction tube wall for a form-fit connection and if they are to be supported against the switching element to produce a seal, it is advantageous to produce the contact pressure by an elastic element, which is located in the grooves inside the suction tube wall and which should be understood as part of the sealing means. This may be accomplished, for instance, by a waved spiral spring. Such an arrangement is particularly suitable for sealing strips, but may also be realized in sealing rings.

A further variant of the invention provides that the sealing ring be constructed of two disks. These disks are provided with an elastic connection along their outer edges. The disks may be made of steel. In this case, a tube is particularly used as the elastic connection, which is glued to the outer edges of the disks. Alternatively, the disks may also be made of synthetic resin material, in which case the elastic connection, for instance made of rubber, is injection molded onto the outer edges of the disk in a multi-component technique. The sealing rings are installed by inserting them into the cylindrical mounting opening. In their undeformed state, they may be slightly undersized or oversized in relation to the inside diameter of the mounting opening, so that the installation forces are small. As soon as the sealing ring is positioned at the intended installation site, the distance between the disks is reduced, which causes the elastic connection to expand radially outwardly until it reaches the wall of the mounting opening. A further approach of the disks will then increase the contact pressure of the sealing ring inside the mounting opening. The distance between the disks may be reduced, for instance, with the aid of a corresponding assembly tool. As an alternative, the switching element may be constructed of different switching disks, which are introduced into the mounting opening alternately with the sealing rings. The seal can then be pressed against the tube wall by pushing the switching disks together. To this end, the disks must have a limit stop that defines the distance between the disks. This can, for instance, be a disk hub. In this case the switching disks are mounted by placing them on a shaft. Along the outside circumference of the switching disks, groove-like notches must remain free to interact with the sealing rings. Pushing them together creates a sealing effect between the sealing ring disks and the adjacent groove flanks of the switching disks.

A special embodiment of the sealing rings constructed in the form of disks provides for a snap connection between the disks to fix the sealing ring in its mounted state. This has the advantage of minimizing the friction that occurs between the above-described groove flanks and the sealing ring. A contact-free labyrinth seal between these components is also possible.

The friction between the sealing means and the switching element, if contact is provided between these components, can be advantageously reduced by providing beads on the sealing means, which are in contact with the switching elements. The beads may also be arranged on the switching element in such a way that they engage with the sealing means. These beads can also enhance the action of labyrinth seals as a flow obstacle.

These and other features of preferred further developments of the invention are set forth in the claims as well as in the description and the drawings. The individual features may be implemented either alone or in combination in the embodiment of the invention or in other fields of application and may represent advantageous embodiments that are protectable per se, for which protection is herewith claimed.

BRIEF DESCRIPTION OF THE DRAWINGS

Further details will now be described by way of example, with reference to schematic embodiments shown in the drawings in which.

DETAILED DESCRIPTION OF PREFERRED EMBODIMENTS

Figure 1:
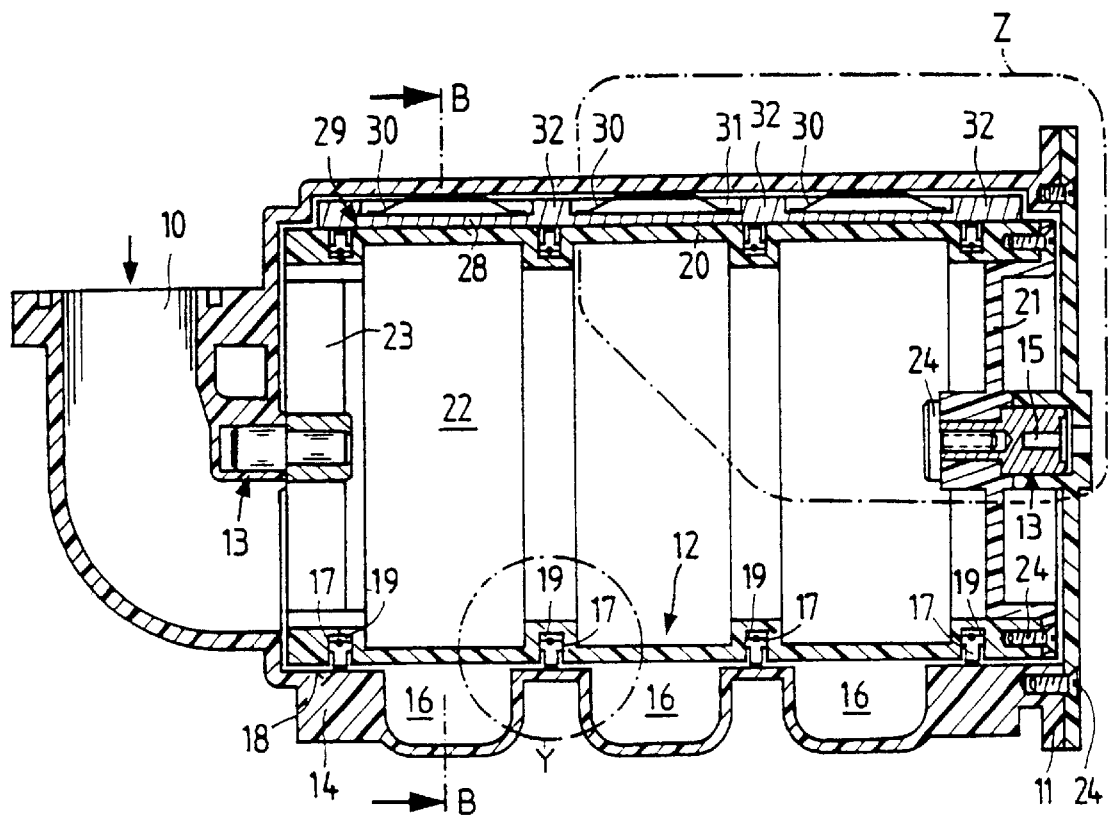
FIG. 1 is a cross-section through a suction tube with a drum switch, which is mounted in one piece inside the suction tube and has a sealing strip as well as four sealing rings along the axis of rotation of the drum switch.

The adjustable suction tube shown in FIG. 1 is substantially cylindrical. An inlet 10 for the filtered intake air is provided on the one end face and a cover 11 for a mounting opening for a drum switch 12 on the other end face. When the cover is removed, drum switch 12 can be inserted into the interior of the suction tube. In its mounted state, this drum switch has two mounting points 13 by which it is supported in a suction tube casing 14 and in the cover 11. The mounting point on the cover side further has a recess 15 for a drive (not shown) of the drum switch 12.

The suction tube is intended for the operation of a three-cylinder internal combustion engine. The intake ports 16 to the cylinders are formed by parts of the inner wall of suction tube casing 14 and the outer wall of drum switch 12. The intake ports thus extend annularly around drum switch 12. Intake ports 16 are sealed with respect to one another and against the remaining suction tube volume by sealing rings 17, which are supported inside cylinder segments 18 of the inner suction tube wall and are inserted in annular grooves 19 in drum switch 12.

Drum switch 12 comprises a drum 20, which is provided with an end disk 21 and thus forms a plenum. The drum bottom is not closed but is made of spoke-like ribs 23. These ribs ensure that the intake air from inlet 10 can reach the plenum 22 irrespective of the angular position of drum switch 12. Screwed connections 24 serve to fasten end disk 21 to drum 20, cover 11 to suction tube casing 14, and one of the supports 13 to end disk 21.

Figure 2:
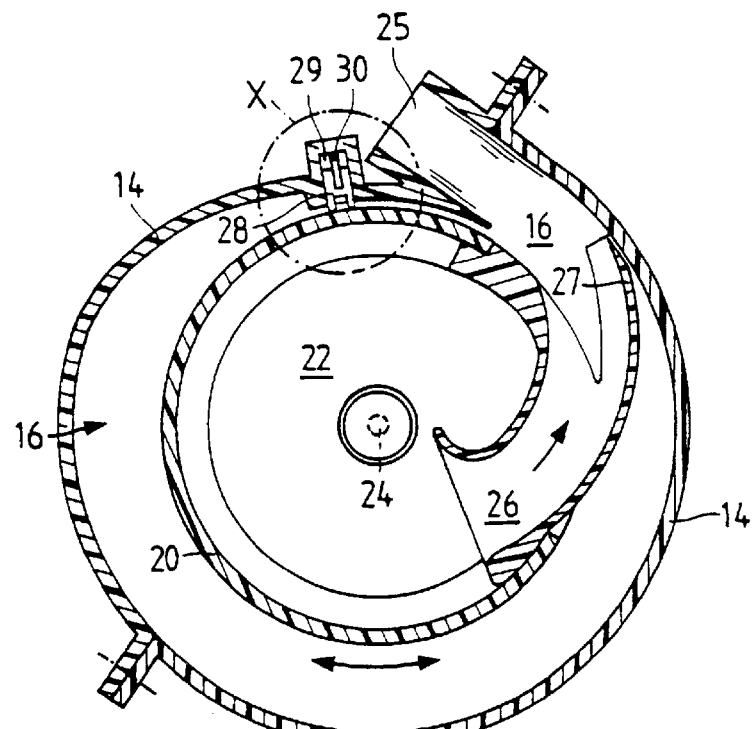
FIG. 2 is a section along line B—B according to FIG. 1.

The path of the intake air from plenum 22 to the cylinder-side outlets may be seen in FIG. 2. Outlet branches 26 projecting into plenum 22 each form a passage through drum 20 and open out into the intake ports 16. These outlet branches end in tongues 27, which are supported inside the wall segments of the suction tube casing 14, forming intake ports 16. Thus, rotating drum switch 12 steplessly adjusts the length of intake ports 16. These intake ports taper toward their ends where they are sealed with respect to outlets 25 by a sealing strip 28 to prevent a short circuit flow. The sealing strip is located in a longitudinal groove 29 inside suction tube casing 14 extending parallel to the axis of rotation of drum switch 12 and is pressed against drum switch 12 by several waved springs 30 (see FIG. 1). Waved springs 30 are located in grooves 31, which are separated from one another by separation blocks 32 (see FIG. 1).

Figure 3:
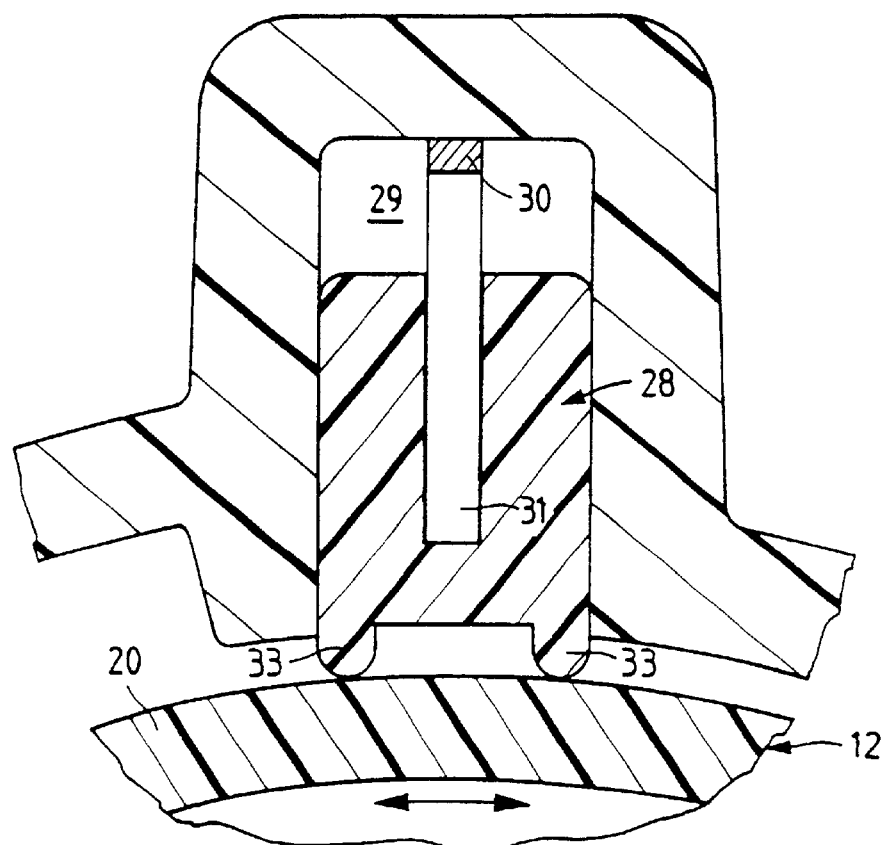
FIG. 3 shows detail X of FIG. 2 in cross section illustrating a sealing strip with a waved spring as the elastic element.

FIG. 3 illustrates the functioning of sealing strip 28. This sealing strip is guided by longitudinal groove 29 and pressed against drum switch 12 by waved springs 30 accommodated in groove 31 and supported against the bottom of longitudinal groove 29. Drum switch 12 can rotate under the sealing strip in either direction as indicated by the arrows. To minimize friction between sealing strip 28 and drum switch 12, the sealing strip has two sealing beads 33, so that the support surface on the drum switch corresponds to two tracks.

Figure 4:
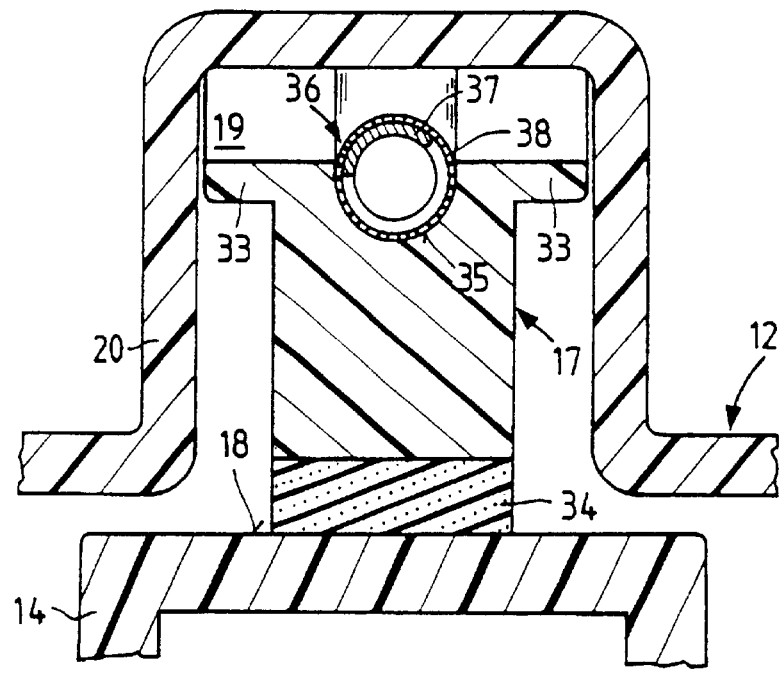
FIG. 4 shows detail Y of FIG. 1 in cross section illustrating a sealing ring with elastic layer and garter spring.

FIG. 4 illustrates the functioning of sealing ring 17. This sealing ring has an elastic layer 34 forming a seal in a cylinder segment 18 of suction tube casing 14. To increase the contact pressure of sealing ring 17, a garter spring 36 is accommodated in an interior ring groove 35. This garter spring comprises a helical spring 37, which is formed into a ring with the aid of a tube 38 and is inserted into interior ring groove 35 in a compressed state. This enhances the radially outwardly directed contact pressure of sealing ring 17. Further, two sealing beads 33 are applied to the lateral edges of the sealing ring. These sealing beads interact with groove 19 in drum switch 12 and thereby form a labyrinth seal. If sealing beads 33 unintentionally contact the groove flanks, e.g., as a result of tolerances, friction is low due to the small bead surface.

Figure 5:
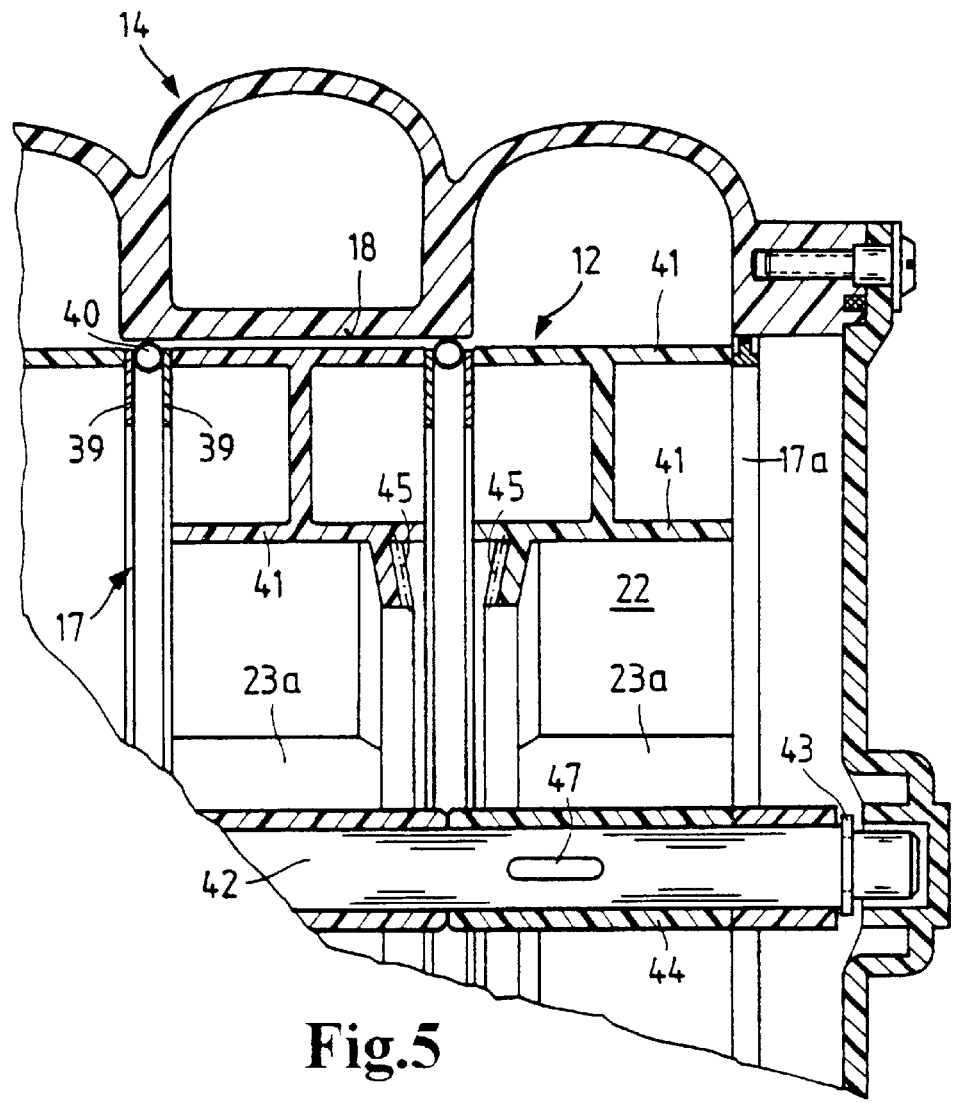
FIG. 5 shows a detail of a suction tube with a drum switch constructed in the form of disks and sealing rings in accordance with detail Z of FIG. 1.

An alternative construction of sealing rings 17 is illustrated in FIG. 5. These sealing rings comprise two disks 39, which are interconnected along their outer circumference by an elastic connection 40. In this type of construction, drum switch 12 is made up of a plurality of switching disks 41. During assembly in suction tube casing 14, sealing rings 17 and switching disks 41 are alternately mounted on a drive shaft 42. The distance between switching disks 41 in the area of sealing rings 17 is determined by their axial hub length. The switching disks are secured against axial displacement on drive shaft 42 by a retaining ring 43. Drive shaft 42 is driven at the end which is not shown.

The exterior of the switching disks is connected with hubs 44 by ribs 23a. The interior of switching disks 41 is used as a plenum 22. Every second switching disk is radially fixed on drive shaft 43 by a feather key connection 47. The switching disks are provided with bevel gearing 45 so that a radially fixed switching disk communicates with the adjacent radially non-fixed switching disk via a bevel gear fixed to the casing (not shown) in such a way that they rotate in opposite direction. In other respects, suction tube casing 14 is constructed as described in FIG. 1.

When switching disks 41 and sealing rings 17 are assembled, the sealing rings are compressed by the switching disks in such a way that the tube-like elastic connections 40 located between disks 39 are pressed against the cylinder segments 18 of suction tube casing 14. This causes them to be fixed inside the suction tube casing, so that when the suction tube is being adjusted there is a relative movement between the counter-rotating switching disks 41 and sealing rings 17. Sealing ring 17a on the last switching disk, which is not inserted between two switching disks, may be configured as shown in FIG. 4.

Figure 6:
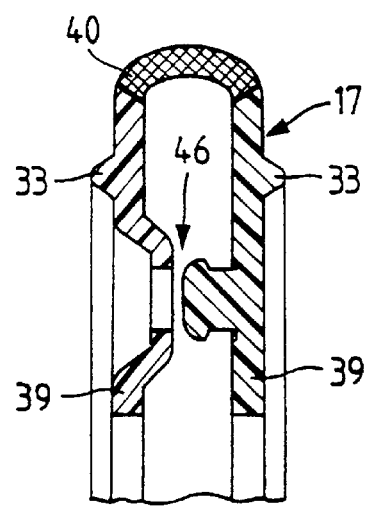
FIG. 6 is a sealing ring constructed in the form of disks with an elastic connection of the disks and a snap connection.

FIG. 6 shows an alternative embodiment of a sealing ring 17 according to FIG. 5. This sealing ring comprises synthetic resin disks produced in a creative forming process, which are connected by a second elastic component acting as elastic connection 40. As disks 39 approach one another, the elastic connection 40 is curved outwardly to provide fixation within the suction tube casing. In their mounted state, disks 39 are held together by a snap connection 46. In addition, the synthetic resin disks are each provided with an annular sealing bead 33, which in the mounted state engages with switching disks 41 (not shown).

What is claimed is:

1. A suction tube having at least one inlet, an outlet and a switching element which forms a drum switch for adjusting the length of different tube segments of the suction tube, wherein said drum switch forms ring-shaped gaps with respect to walls of the suction tube and is movable within the suction tube, and wherein at least one sealing ring is arranged in said gaps, said sealing ring being partly located in grooves adjacent said gaps, having elastically deformable parts to produce contact pressure, and being fixedly supported inside the suction tube, and said elastically deformable parts comprising an elastic layer which contacts the walls of the suction tube.

2. A suction tube having at least one inlet, an outlet and a switching element which forms a drum switch for adjusting the length of different tube segments of the suction tube, wherein said drum switch forms ring-shaped gaps with respect to walls of the suction tube and is movable within the suction tube, and wherein at least one sealing ring is arranged in said gaps, said sealing ring being partly located in grooves adjacent said gaps, having elastically deformable parts to produce contact pressure, and being fixedly supported inside the suction tube, and said elastically deformable parts comprising an elastic layer which contacts the walls of the suction tube, wherein said at least one sealing ring has split and a larger diameter than the suction tube in its uninstalled state; said sealing ring being deformed to a smaller diameter when it is installed inside the section tube.

3. A suction tube according to claim 2, further comprising a compressed garter spring arranged along a radially inner surface of the at least one sealing ring for increasing the pressure of said sealing ring against the walls of the suction tube when installed therein.

4. A suction tube having at least one inlet, an outlet and a switching element which forms a drum switch for adjusting the length of different tube segments of the suction tube, wherein said drum switch forms ring-shaped gaps with respect to walls of the suction tube and is movable within the suction tube, and wherein at least one sealing ring is arranged in said gaps, said sealing ring being partly located in grooves adjacent said gaps, having elastically deformable parts to produce contact pressure, and being fixedly supported inside the suction tube, and said elastically deformable parts comprising an elastic layer which contacts the walls of the suction tube, wherein said sealing rings do not contact the switching element.

5. A suction tube according to claim 4, wherein sealing rings engage in grooves in said switching element and form a labyrinth seal.

6. A suction tube having at least one inlet, an outlet and a switching element which forms a drum switch for adjusting the length of different tube segments of the suction tube, wherein said drum switch forms ring-shaped gaps with respect to walls of the suction tube and is movable within the suction tube, and wherein at least one sealing ring is arranged in said gaps, said sealing ring being partly located in grooves adjacent said gaps, having elastically deformable parts to produce contact pressure, and being fixedly supported inside the suction tube, and said elastically deformable parts comprising an elastic layer which contacts the walls of the suction tube, wherein said sealing rings are provided with sealing beads which contact the switching element.

7. A suction tube having at least one inlet, an outlet, and a switching element which forms a drum switch for adjusting the length of different tube segments of the suction tube, wherein said drum switch forms ring-shaped gaps with respect to walls of the suction tube and is movable within the suction tube, and wherein at least one sealing ring is arranged in said gaps, said sealing ring being partly located in grooves adjacent said gaps, having elastically deformable parts to produce contact pressure, and being fixedly supported inside the suction tube, said sealing ring comprising a pair of disks having an elastic connection between outer edges thereof said elastic connection constituting the elastically deformable part of said sealing ring, and said disks being spaced apart a greater axial distance in their uninstalled state and being compressed to a smaller axial spacing when installed inside the suction tube so that the elastic connection is radially outwardly deformed and pressed against the walls of the suction tube.

8. A suction tube according to claim 7, wherein said elastic connection comprises a tube.

9. A suction tube having at least one inlet, an outlet, and a switching element which forms a drum switch for adjusting the length of different tube segments of the suction tube, wherein said drum switch forms ring-shaped gaps with respect to walls of the suction tube and is movable within the suction tube, and wherein at least one sealing ring is arranged in said gaps, said sealing ring being partly located in grooves adjacent said gaps, having elastically deformable parts to produce contact pressure, and being fixedly supported inside the suction tube, said sealing ring comprising a pair of disks having an elastic connection between outer edges thereof, said elastic connection constituting the elastically deformable part of said sealing ring, and said disks being spaced apart a greater axial distance in their uninstalled state and being compressed to a smaller axial spacing when installed inside the suction tube so that the elastic connection is radially outwardly deformed and pressed against the walls of the suction tube, wherein the disks have snap connection which are connected when the sealing ring is installed in the drum switch.

10. A suction tube having at least one inlet, an outlet, and a switching element which forms a drum switch for adjusting the length of different tube segments of the suction tube, wherein said drum switch forms ring-shaped gaps with respect to walls of the suction tube and is movable within the suction tube, and wherein at least one sealing ring is arranged in said gaps, said sealing ring being partly located in grooves adjacent said gaps, having elastically deformable parts to produce contact pressure, and being fixedly supported inside the suction tube, said sealing ring comprising a pair of disks having an elastic connection between outer edges thereof, said elastic connection constituting the elastically deformable part of said sealing ring, and said disks being spaced apart a greater axial distance in their uninstalled state and being compressed to a smaller axial spacing when installed inside the suction tube so that the elastic connection is radially outwardly deformed and pressed against the walls of the suction tube, wherein said sealing rings do not contact the switching element.

11. A suction tube according to claim 10, wherein sealing rings engage in grooves in said switching element and form a labyrinth seal.

12. A suction tube having at least one inlet, an outlet, and a switching element which forms a drum switch for adjusting the length of different tube segments of the suction tube, wherein said drum switch forms ring-shaped gaps with respect to walls of the suction tube and is movable within the suction tube, and wherein at least one sealing ring is arranged in said gaps, said sealing ring being partly located in grooves adjacent said gaps, having elastically deformable parts to produce contact pressure, and being fixedly supported inside the suction tube, said sealing ring comprising a pair of disks having an elastic connection between outer edges thereof, said elastic connection constituting the elastically deformable part of said sealing ring, and said disks being spaced apart a greater axial distance in their uninstalled state and being compressed to a smaller axial spacing when installed inside the suction tube so that the elastic connection is radially outwardly deformed and pressed against the walls of the suction tube, wherein said sealing rings are provided with sealing beads which contact the switching element.

* * * * *